US006997047B2

(12) United States Patent
Naruse et al.

(10) Patent No.: US 6,997,047 B2
(45) Date of Patent: Feb. 14, 2006

(54) WHEEL BALANCE ADJUSTING DEVICE AND WHEEL BALANCE ADJUSTING METHOD

(75) Inventors: Yutaka Naruse, Kodaira (JP); Yozo Hattori, Owariasahi (JP)

(73) Assignees: Bridgestone Corporation, Tokyo (JP); Yuugengaisha North Targa, Aichi (JP)

( * ) Notice: Subject to any disclaimer, the term of this patent is extended or adjusted under 35 U.S.C. 154(b) by 183 days.

(21) Appl. No.: 10/468,206

(22) PCT Filed: Feb. 4, 2002

(86) PCT No.: PCT/JP02/00873

§ 371 (c)(1),
(2), (4) Date: Dec. 23, 2003

(87) PCT Pub. No.: WO02/066949

PCT Pub. Date: Aug. 29, 2002

(65) Prior Publication Data

US 2004/0095012 A1 May 20, 2004

(30) Foreign Application Priority Data

Feb. 20, 2001 (JP) ............................ 2001-044114

(51) Int. Cl.
*G01M 17/02* (2006.01)

(52) U.S. Cl. ........................................................ 73/146

(58) Field of Classification Search ............. 152/154.1, 152/541, 517; 73/146

See application file for complete search history.

(56) References Cited

U.S. PATENT DOCUMENTS

| | | | | |
|---|---|---|---|---|
| 4,817,429 | A | 4/1989 | Goebel | |
| 5,120,113 | A | 6/1992 | Oyama et al. | |
| 6,606,902 | B2 * | 8/2003 | Koeune et al. | 73/146 |
| 6,668,635 | B2 * | 12/2003 | Kunsch et al. | 73/146 |
| 6,672,148 | B2 * | 1/2004 | Kunsch et al. | 73/146 |

FOREIGN PATENT DOCUMENTS

| | | | |
|---|---|---|---|
| EP | 0 522 464 | A1 | 1/1993 |
| EP | 0 681 170 | A2 | 11/1995 |
| JP | 62-203037 | A | 9/1987 |
| JP | 63-142228 | A | 6/1988 |
| JP | 4-218740 | A | 8/1992 |
| JP | 6-048101 | A | 2/1994 |
| JP | 9-039523 | A | 2/1997 |
| JP | 11-254921 | A | 9/1999 |

OTHER PUBLICATIONS

European Search Report.

* cited by examiner

*Primary Examiner*—William Oen
(74) *Attorney, Agent, or Firm*—Sughrue Mion, PLLC

(57) ABSTRACT

A wheel balance adjustment device and wheel balance adjustment method which can improve directional stability and handling stability are provided.

In a case in which one third of a rim peripheral direction length (W) of a correction weight 42 (W/3) is shorter than a rim peripheral direction length S corresponding to a ground contact length of a tire assembled to a rim 18, the directional stability and handling stability can be improved by dispersing the correction weight 42 in the rim peripheral direction and attaching at predetermined positions of the rim periphery (a point B, a point K and a point G).

8 Claims, 11 Drawing Sheets

(CONTINUED ON FIG.7-1)

FIG.7-1
(CONTINUED FROM FIG.7)
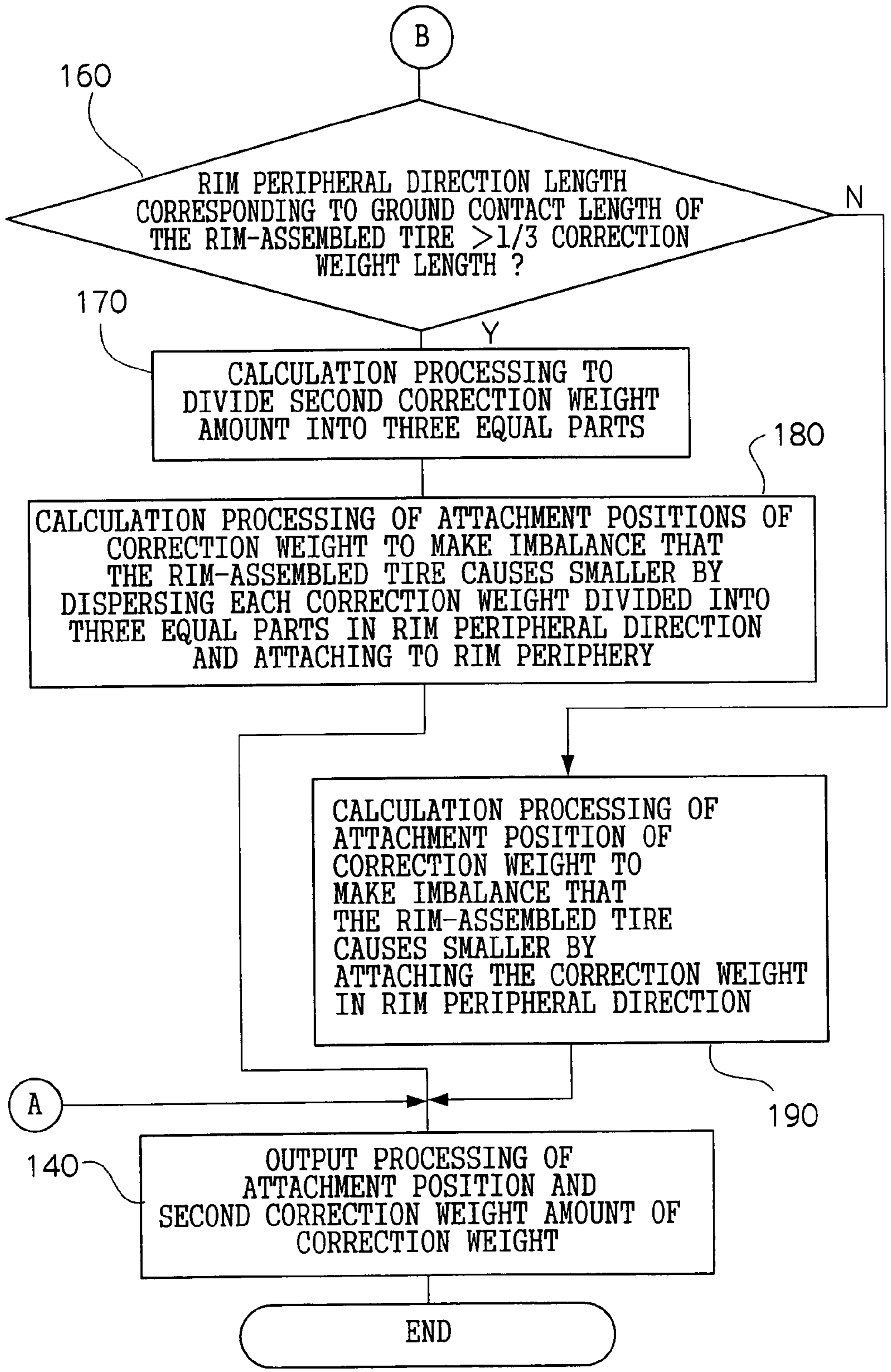

WHEEL BALANCE ADJUSTING DEVICE AND WHEEL BALANCE ADJUSTING METHOD

TECHNICAL FIELD

The present invention relates to a wheel balance adjustment device and wheel balance adjustment method which reduce an imbalance caused by a force relationship between a weight imbalance and a correction weight when a weight imbalance portion of a tire is in ground contact.

RELATED ART

It is well known that vibrations occur in a case in which a tire assembled to a rim is rotated in a state of imbalance in weight. Also, there is a static imbalance, which is present even when the rim-assembled tire is not rotated (static imbalance), and a dynamic imbalance that occurs when the tire starts to be rotated (dynamic imbalance).

As a method for correcting such a weight imbalance, principally at the present time the rim-assembled tire is rotated by a wheel balancer, and an imbalance amount which is required to be corrected and attachment positions of correction weights are measured. On the basis thereof, the correction weights are affixed at two faces, both of axial direction end faces of the rim or an inner face and an end face of the rim, and corrections of the static imbalance and dynamic imbalance are carried out at the same time.

PROBLEM TO BE SOLVED BY THE INVENTION

However, with the imbalance correction method described above, it is clear that there are still vibrations in the tire when the tire moves at high speed in ground contact, and effects are exerted on handling stability.

That is, as shown in FIG. 10, when a portion G1 of a weight imbalance portion G of a tire 300 is in ground contact at a road surface, a centrifugal force F1 of the weight imbalance portion G1 in ground contact with the road surface is counteracted by a reaction force F from the road surface.

In particular, in a case in which a length in a rim peripheral direction of a correction weight 320 which is attached to a periphery of a rim 310 is comparatively short, centrifugal forces F2 act from weight imbalance portions G2 that are present outside a ground contact region of the tire 300 (the diagonal line portions in FIG. 10). Consequently, an equilibrium relationship between a centrifugal force FT from the correction weight 320 and a centrifugal force from the weight imbalance G greatly deteriorates.

As a result thereof, an imbalance of forces between the correction weight 320 and the weight imbalance G occurs. Because of this force imbalance, vibrations (displacement forces) which exert detrimental effects on directional stability and handling stability will occur.

Accordingly, the present invention addresses the provision of a wheel balance adjustment device and wheel balance adjustment method capable of reducing the vibrations mentioned above and improving directional stability and handling stability by, in a predetermined case, dividing a correction weight into a plurality of units, dispersing the correction weight in a rim peripheral direction, and attaching the correction weight to a rim periphery.

DISCLOSURE OF THE INVENTION

A wheel balance adjustment device recited in claim 1 is characterized by comprising: first calculating means which calculates an attachment position and correction weight amount of a correction weight which counteracts a weight imbalance of a tire assembled to a rim; first comparing means which compares a rim peripheral direction length corresponding to a tire peripheral direction ground contact length of a ground contact region, at which the rim-assembled tire contacts a road surface, with a rim peripheral direction length of the correction weight; and second calculating means which, in a case in which the rim peripheral direction length of the correction weight is shorter than the rim peripheral direction length corresponding to the ground contact length, and in a case in which the rim peripheral direction length of the correction weight is longer than the rim peripheral direction length corresponding to the ground contact length that is a case in which a portion by which the correction weight is longer than the rim peripheral direction length corresponding to the ground contact length is not more than a predetermined value, calculates attachment positions of the correction weight, which has been divided, in order to make an imbalance that occurs when a portion of the weight imbalance portion of the rim-assembled tire is in ground contact smaller by dividing the correction weight into a plurality of units, dispersing in the rim peripheral direction and attaching the units to the rim periphery.

Next, operations and effects of the wheel balance adjustment device recited in claim 1 will be described.

As has been described for the related art, in a case in which a tire assembled to a rim, at which a correction weight has been attached and a weight imbalance corrected, is mounted to an automobile and the automobile drives at high speed, when a portion of the weight imbalance portion of the tire is in ground contact with the road surface, a centrifugal force of the weight imbalance portion of the tire that contacts the road surface is counteracted by reaction from the road surface. Consequently, an equilibrium between a centrifugal force that the correction weight causes and a centrifugal force that the whole of the weight imbalance portion causes greatly deteriorates, to the extent of an amount corresponding to this counteracted centrifugal force of the weight imbalance portion. Further, this is particularly remarkable in a case in which the rim peripheral direction length of the correction weight is short. As a result thereof, when a portion of the weight imbalance portion is in ground contact, a force relationship between the correction weight and the weight imbalance becomes unbalanced, and vibrations which exert detrimental effects on directional stability and handling stability will occur.

Here, in the wheel balance adjustment device of the present invention, the imbalance mentioned above can be made smaller by dispersing the correction weight, which is divided into a plurality of units, in the rim peripheral direction and attaching the correction weight at attachment positions calculated by the following processing.

That is, at the first calculating means, the attachment position and correction weight amount of the correction weight which counteracts the weight imbalance of the rim-assembled tire (herebelow referred to as "the tire" where appropriate) is calculated. The rim peripheral direction length of the correction weight is specified by this calculation of the correction weight amount of the correction weight.

At the first comparing means, the rim peripheral direction length corresponding to the tire peripheral direction ground contact length, which contacts a road surface when the rim-assembled tire is attached to a vehicle, is compared with the rim peripheral direction length of the correction weight.

By the way, the rim peripheral direction length corresponding to the ground contact length of the rim-assembled tire, which is an object of comparison at the first comparing means, may be found by: first, inputting a tire size of the rim-assembled tire, an axle load and the like at separately provided inputting means, calculating separately at calculating means on the basis of these inputted values, and calculating a tire peripheral direction ground contact length of the tire; and then calculating a rim peripheral direction length positioned at a portion inside two points which, of four points at which straight lines joining ground contact points (two points), which are positioned at both of tire peripheral direction end portions of this ground contact length, with a tire center point respectively cross the rim periphery, form angles of 180° with respect to the respective ground contact points (a side of the tire opposite to the ground contact region). Further, in a case in which the rim peripheral direction length corresponding to the ground contact portion of the tire is clear from the beginning, the rim peripheral direction length corresponding to the ground contact length of the tire may be directly inputted at separately provided inputting means.

As a result thereof, at the second calculating means, in the case in which the rim peripheral direction length of the correction weight is shorter than the rim peripheral direction length corresponding to the ground contact length and in the case, being a case in which the rim peripheral direction length of the correction weight is longer than the rim peripheral direction length corresponding to the ground contact length, in which the portion by which the correction weight is longer than the rim peripheral direction length corresponding to the ground contact length is not more than the predetermined value, the attachment positions of the divided correction weight are calculated in order to make the imbalance that occurs when a portion of the weight imbalance portion of the rim-assembled tire is in ground contact smaller by dividing the correction weight into the plurality of units, dispersing the units in the rim peripheral direction and attaching the units to the rim periphery.

The divided correction weight each is attached to the rim periphery on the basis of these calculation results of the second calculating means. At this time, positions of centers of gravity of the correction weights are made to coincide with the attachment positions, and the correction weights are attached.

By the way, displaying means, which displays the attachment positions of the correction weights that have been calculated at the second calculating means, may be separately provided, and each correction weight may be attached to the rim periphery in accordance with this displaying means.

As described above, by attaching the divided correction weight on the basis of the results of calculation processing at the wheel balance adjustment device, the imbalance that occurs when a portion of the weight imbalance portion of the tire is in ground contact can be made smaller, and the amplitudes of vibrations which exert detrimental effects on the directional stability and handling stability can be reduced.

By the way, the "correction weight amount" means the weight of the correction weight. Further, the "rim peripheral direction length of the correction weight" means the length of the correction weight measured along the rim peripheral direction in a case in which the correction weight is attached to the rim periphery.

A wheel balance adjustment device recited in claim 2 is characterized by further comprising: storing means which stores a plurality of correction weights whose correction weight amounts are the same and whose rim peripheral direction lengths and rim transverse direction lengths differ; second comparing means which compares the rim peripheral direction length of the correction weight with a rim periphery length of the rim of the rim-assembled tire; and changing means which, in a case in which the rim peripheral direction length of the correction weight is at least a predetermined value of the rim periphery length, selects a different correction weight, whose rim peripheral direction length is less than the predetermined value of the rim periphery length, from the plurality of correction weights stored in the storing means and changes the correction weight, and characterized by, at the first comparing means, comparing the rim peripheral direction length corresponding to the ground contact length with the rim peripheral direction length of the different correction weight, and at the second calculating means, in a case in which the rim peripheral direction length of the different correction weight is shorter than the rim peripheral direction length corresponding to the ground contact length, and in a case in which the rim peripheral direction length of the different correction weight is longer than the rim peripheral direction length corresponding to the ground contact length that is a case in which a portion by which the different correction weight is longer than the rim peripheral direction length corresponding to the ground contact length is not more than a predetermined value, calculating attachment positions of the different correction weight, which has been divided, in order to make an imbalance that occurs when a portion of the weight imbalance portion of the rim-assembled tire is in ground contact smaller by dividing the different correction weight into a plurality of units, dispersing in the rim peripheral direction and attaching the units weight to the rim periphery.

Next, operations and effects of the wheel balance adjustment device recited in claim 2 will be described.

Even in a case in which the rim peripheral direction length of the correction weight is greater than or equal to the predetermined value of the rim periphery length of the rim, when the correction weight is attached to the rim periphery, the force relationship between the weight imbalance of the rim-assembled tire and the correction weight becomes unbalanced, and the vibrations which exert detrimental effects on the directional stability and handling stability will occur.

Accordingly, in the present invention, the plurality of correction weights whose correction weight amounts are the same and whose rim peripheral direction lengths and rim transverse direction lengths differ are stored at the storing means in advance.

At the second comparing means, the rim peripheral direction length of the correction weight is compared with the rim periphery length of the rim of the rim-assembled tire. By the way, the rim periphery length of the rim of the rim-assembled tire which is compared at the second comparing means may be found by inputting a rim size of the rim-assembled tire at separate inputting means and calculating separately at calculating means on the basis of this inputted value. Further, in a case in which the rim periphery length is clear from the beginning, the rim periphery length may be directly inputted at separately provided inputting means.

In a case in which a result of the comparison at the second comparing means is that the rim peripheral direction length of the correction weight is greater than or equal to the predetermined value of the rim periphery length, at the changing means, the different correction weight, the rim peripheral direction length of which is less than the predetermined value of the rim periphery length, is extracted from the storing means and the correction weight is changed.

At the first comparing means, the rim peripheral direction length corresponding to the ground contact length is compared with the rim peripheral direction length of the different correction weight. At the second comparing means, in the case in which the rim peripheral direction length of the different correction weight is shorter than the rim peripheral direction length corresponding to the ground contact length and in the case, being a case in which the rim peripheral direction length of the different correction weight is longer than the rim peripheral direction length corresponding to the ground contact length, in which the portion by which the different correction weight is longer than the rim peripheral direction length corresponding to the ground contact length is less than or equal to the predetermined value, the attachment positions of the divided different correction weight are calculated in order to make the imbalance that occurs when a portion of the weight imbalance portion of the rim-assembled tire is in ground contact smaller by dividing the different correction weight into the plurality of units, dispersing the units in the rim peripheral direction and attaching the units.

The correction weights of the different are attached to the rim periphery in accordance with these calculation results such that centers of gravity are positioned at the attachment positions. By the way, the attachment positions mentioned above may be displayed at the displaying means, and the correction weights attached.

As described above, according to the present invention, a correction weight can be used with which the rim peripheral direction length of the correction weight is less than the predetermined value of the rim periphery length, and the amplitudes of the vibrations which exert detrimental effects on the directional stability and handling stability can be reduced.

By the way, the "rim transverse direction length of the correction weight" means the length of the correction weight measured along the rim transverse direction in a case in which the correction weight is attached to the rim periphery.

A wheel balance adjustment device recited in claim 3 is characterized by the attachment positions of the correction weight which has been divided at the second calculating means being a position which opposes a weight imbalance portion which is present at the ground contact region at which the tire is in ground contact with the road surface and positions which oppose weight imbalance portions which are present outside the ground contact region of the tire.

Next, operations and effects of the wheel balance adjustment device recited in claim 3 will be described.

At the second calculating means, the attachment positions of each divided correction weight are set to the position facing the weight imbalance portion that is present at the ground contact region, at which the tire is in ground contact with the road surface, and the positions facing the weight imbalance portions that are present outside the ground contact region of the tire. By attaching each correction weight, which is dispersed respectively to these positions, the imbalance that occurs when a portion of the weight imbalance portion is in ground contact can be minimized, and the amplitudes of the vibrations which exert detrimental effects on the directional stability and handling stability can be reduced.

A wheel balance adjustment device recited in claim 4 is characterized by, at the second calculating means, in a case in which the rim peripheral direction length of the correction weight is longer than the rim peripheral direction length corresponding to the ground contact length that is a case in which the portion by which the correction weight is longer than the rim peripheral direction length corresponding to the ground contact length is greater than the predetermined value, calculating an attachment position of the correction weight in order to make the imbalance that occurs when a portion of the weight imbalance portion of the rim-assembled tire is in ground contact smaller by attaching the correction weight to the rim periphery without dispersing the correction weight.

Next, operations and effects of the wheel balance adjustment device recited in claim 4 will be described.

At the second calculating means, in the case, being a case in which the rim peripheral direction length of the correction weight is longer than the rim peripheral direction length corresponding to the ground contact length, in which the portion by which the correction weight is longer than the rim peripheral direction length corresponding to the ground contact length is greater than the predetermined value, the attachment position of the correction weight is calculated in order to make the imbalance that occurs when a portion of the weight imbalance portion of the rim-assembled tire is in ground contact smaller by attaching the correction weight to the rim periphery without dispersing the correction weight. By the way, it is preferable if the attachment position of the correction weight is displayed at the displaying means.

According to the present invention, in the case in which the portion by which the correction weight is longer than the rim peripheral direction length corresponding to the ground contact length is greater than the predetermined value, which is a case in which the rim peripheral direction length of the correction weight is longer than the rim peripheral direction length corresponding to the ground contact length, centrifugal forces due to the weight imbalance portions outside the ground contact region of the tire can be made smaller by positioning the center of gravity of the correction weight at the attachment position mentioned above and attaching the correction weight, without needing to divide the correction weight into a plurality of units, disperse the correction weight in the rim peripheral direction and attach the correction weight. As a result thereof, the amplitudes of the vibrations which exert detrimental effects on the directional stability and handling stability can be reduced.

A wheel balance adjustment method recited in claim 5 is characterized by comprising: a tire attaching step of attaching a tire assembled to a rim to a wheel balance adjustment device (recited in any one of claims 1 to 4); a first calculating step of calculating an attachment position and correction weight amount of a correction weight which counteracts a weight imbalance of the rim-assembled tire; a first comparing step of comparing a rim peripheral direction length corresponding to a tire peripheral direction ground contact length of a ground contact region, at which the rim-assembled tire contacts a road surface when the rim-assembled tire is attached to a vehicle, with a rim peripheral direction length of the correction weight; a second calculating step of, in a case in which the rim peripheral direction length of the correction weight is shorter than the rim peripheral direction length corresponding to the ground contact length, and in a case in which the rim peripheral direction length of the correction weight is longer than the rim peripheral direction length corresponding to the ground contact length that is a case in which a portion by which the correction weight is longer than the rim peripheral direction length corresponding to the ground contact length is not more than a predetermined value, calculating attachment positions of the correction weight, which has been divided, in order to make an imbalance that occurs when a portion of the weight imbalance portion of the rim-assembled tire is in ground contact smaller by dividing the correction weight into a plurality of units, dispersing in the rim peripheral direction and attaching the units to the rim periphery; and a weight attaching step of attaching each of the correction weight that has been divided at the attachment positions of the correction weight of the second calculating step.

Next, operations and effects of the wheel balance adjustment method recited in claim 5 will be described.

According to the wheel balance adjustment method of the present invention, the imbalance that occurs when a portion of the weight imbalance portion of the tire is in ground contact can be made smaller by attaching the divided correction weight on the basis of the results of calculation processing, and the amplitudes of the vibrations which exert detrimental effects on the directional stability and handling stability can be reduced.

A wheel balance adjustment method recited in claim 6 is characterized by further comprising: a storing step of storing a plurality of correction weights whose correction weight amounts are the same and whose rim peripheral direction lengths and rim transverse direction lengths differ; a second comparing step of comparing the rim peripheral direction length of the correction weight with a rim periphery length of the rim of the rim-assembled tire; and a changing step of, in a case in which the rim peripheral direction length of the correction weight is at least a predetermined value of the rim periphery length, selecting a different correction weight, whose rim peripheral direction length is less than the predetermined value of the rim periphery length, from the plurality of stored correction weights and changing the correction weight, and characterized by, in the first comparing step, comparing the rim peripheral direction length corresponding to the ground contact length with the rim peripheral direction length of the different correction weight, in the second calculating step, in a case in which the rim peripheral direction length of the different correction weight is shorter than the rim peripheral direction length corresponding to the ground contact length, and in a case in which the rim peripheral direction length of the different correction weight is longer than the rim peripheral direction length corresponding to the ground contact length that is a case in which a portion by which the different correction weight is longer than the rim peripheral direction length corresponding to the ground contact length is not more than a predetermined value, calculating attachment positions of the different correction weight, which has been divided, in order to make an imbalance that occurs when a portion of the weight imbalance portion of the rim-assembled tire is in ground contact smaller by dividing the different correction weight into a plurality of units, dispersing in the rim peripheral direction and attaching the units to the rim periphery, and in the weight attaching step, attaching each of the different correction weight that has been divided at the attachment positions of the different correction weight of the second calculating step.

Next, operations and effects of the wheel balance adjustment method recited in claim 6 will be described.

According to the wheel balance adjustment method of the present invention, a correction weight can be used with which the rim peripheral direction length of the correction weight is less than the predetermined value of the rim periphery length, and the amplitudes of the vibrations which exert detrimental effects on the directional stability and handling stability can be reduced.

A wheel balance adjustment method recited in claim 7 is characterized by the correction weight which has been divided being attached at a position which opposes a weight imbalance portion which is present at the ground contact region at which the tire is in ground contact with the road surface and positions which oppose weight imbalance portions which are present outside the ground contact region of the tire.

Next, operations and effects of the wheel balance adjustment method recited in claim 7 will be described.

According to the wheel balance adjustment method of the present invention, the imbalance that occurs when a portion of the weight imbalance portion is in ground contact can be minimized by attaching each correction weight, which is dispersed to each aforementioned position, and the amplitudes of the vibrations which exert detrimental effects on the directional stability and handling stability can be reduced.

A wheel balance adjustment method recited in claim 8 is characterized by, in the second calculating step, in a case in which the rim peripheral direction length of the correction weight is longer than the rim peripheral direction length corresponding to the ground contact length that is a case in which the portion by which the correction weight is longer than the rim peripheral direction length corresponding to the ground contact length is greater than the predetermined value, calculating an attachment position of the correction weight in order to make the imbalance that occurs when a portion of the weight imbalance portion of the rim-assembled tire is in ground contact smaller by attaching the correction weight to the rim periphery without dispersing the correction weight, and in the weight attaching step, attaching the correction weight at the attachment position of the correction weight of the second calculating step.

Next, operations and effects of the wheel balance adjustment method recited in claim 8 will be described.

According to the wheel balance adjustment method of the present invention, in the case, being a case in which the rim peripheral direction length of the correction weight is longer than the rim peripheral direction length corresponding to the ground contact length, in which the portion by which the correction weight is longer than the rim peripheral direction length corresponding to the ground contact length is greater than the predetermined value, centrifugal forces due to the weight imbalance portions outside the ground contact region of the tire can be made smaller by positioning the center of gravity of the correction weight at the attachment position mentioned above and attaching the correction weight, without needing to divide the correction weight into a plurality of units, disperse the correction weight in the rim peripheral direction and attach the correction weight. As a result thereof, the amplitudes of the vibrations which exert detrimental effects on the directional stability and handling stability can be reduced.

BEST MODE FOR CARRYING OUT THE INVENTION

Herebelow, a wheel balance adjustment device relating to one embodiment of the present invention will be described with reference to the attached drawings.

First, overall structure of the wheel balance adjustment device will be described.

Figure 1:
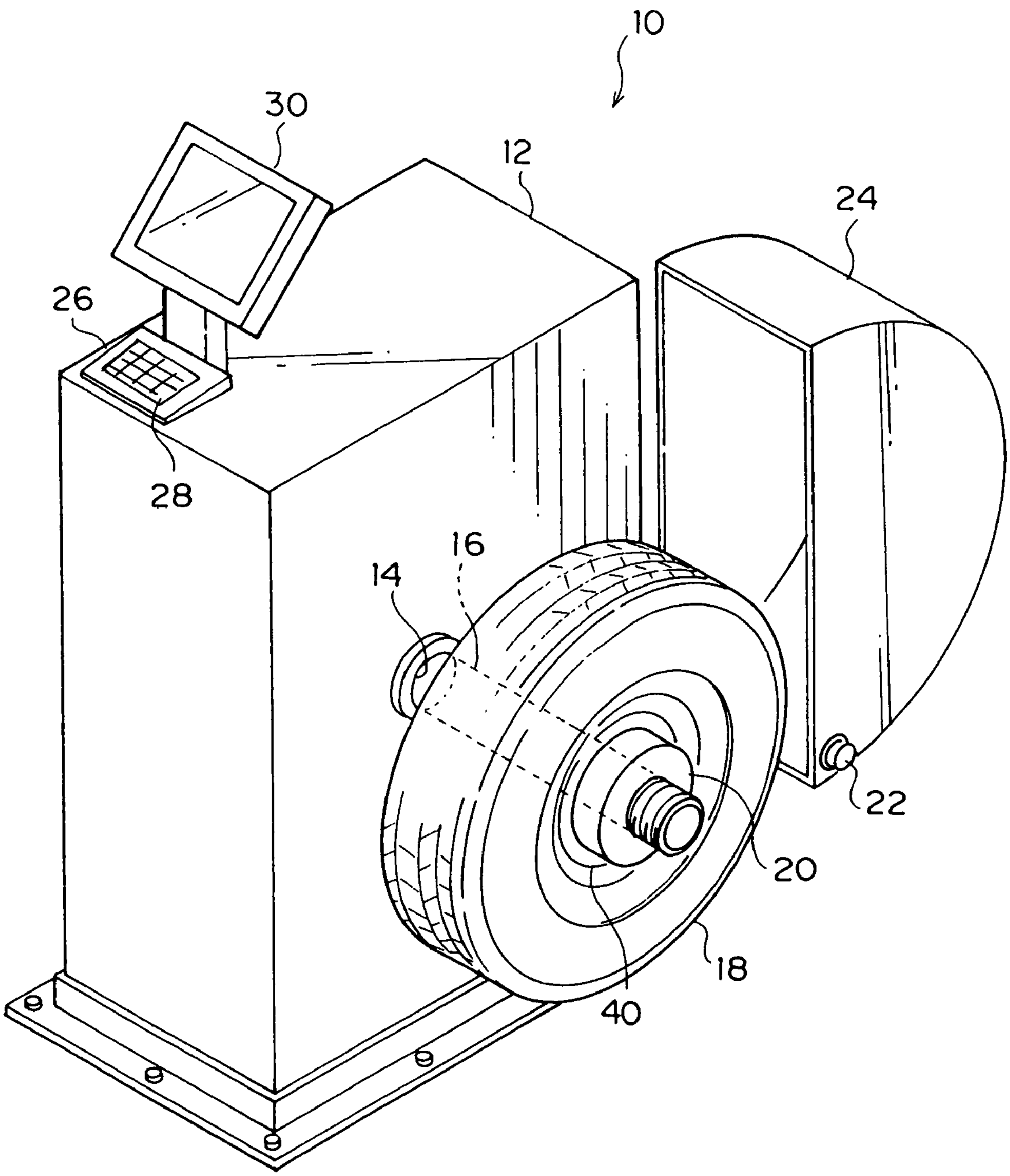
FIG. 1 is a perspective view of a state in which a tire assembled to a rim is mounted at a wheel balance adjustment device relating to one embodiment of the present invention.

As shown in FIG. 1, a balancer 10 (the wheel balance adjustment device) is provided with a box-form balancer main body 12. A round hole 14 is formed at one side face of this balancer main body 12, and a rotation shaft 16 passes through at this round hole 14. A bearing (not shown) is provided at the interior of the balancer main body 12. The rotation shaft 16 is supported by this bearing.

Further, a drive motor (not shown) is provided at the interior of the balancer main body 12. A gear (not shown) which is attached to a drive shaft (not shown) of this drive motor meshes with a gear (not shown) which is attached to an end portion of the rotation shaft 16. Consequently, when the drive motor operates, the rotation shaft 16 rotates.

By the way, a rim-assembled tire 18 is attached to this rotation shaft 16, and is fixed with a fixing utensil 20 from an outer side such that the rim-assembled tire 18 will not be removed from the rotation shaft 16 by rotation.

Further, a shaft 22, which extends substantially in parallel with the rotation shaft 16, is provided at the one side face of the balancer main body 12. A tire cover 24, which has a semi-circular shape in a side face view, is rotatably attached to this shaft 22. When the rim-assembled tire 18 is fixed to the shaft 22 and rotated, safety of an operator is improved by an upper half of the rotating rim-assembled tire 18 being covered by the tire cover 24.

Meanwhile, an input device 26 is attached to an upper face of the balancer main body 12. A plurality of panels 28 is provided at this input device 26. A reference position of the rim at the balancer main body 12, rim size, tire size, ground contact length of the rim-assembled tire 18 and the like of the rim-assembled tire 18 are inputted by these panels 28.

By the way, a separately provided arm (not shown) may be provided at the balancer main body 12 or the tire cover 24, and this arm may, by being contacted with the rim or the tire, optically detect the reference position of the rim on the balancer main body, the rim size and the tire size. Accordingly, labor of input to the input device 26 can be saved.

Further, a monitor 30 is attached at a vicinity of the input device 26. Attachment positions (see FIGS. 3 and 5) of a correction weight 42, which are calculated by processing at a central calculation processing device 32 (a CPU, see FIG. 2), correction weight amounts of the correction weight 42 attached at the attachment positions, and a type of the correction weight selected by the central calculation processing device 32 are displayed at this monitor 30, which is described later.

Figure 2:
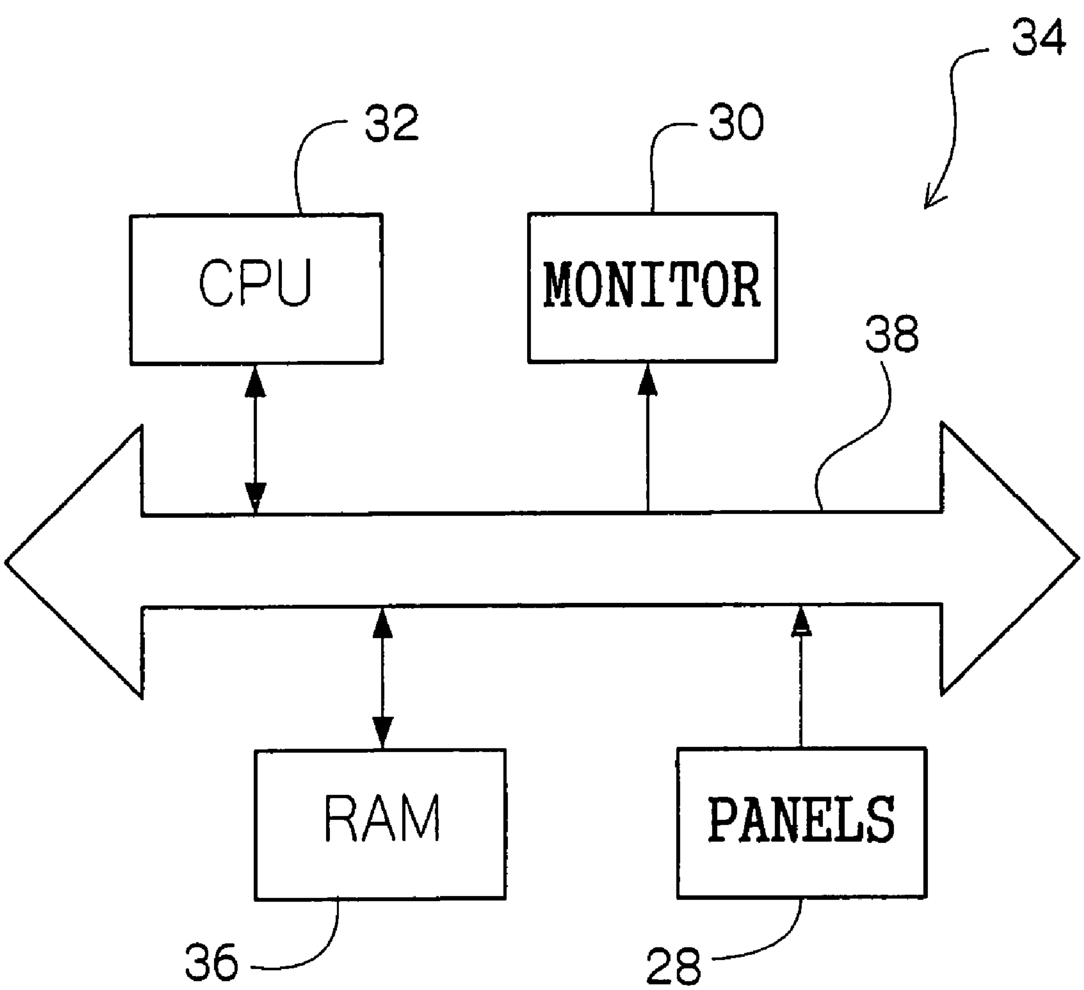
FIG. 2 is a block diagram of a control section provided at the wheel balance adjustment device relating to the one embodiment of the present invention.

Further, as shown in FIG. 2, a control section 34 is provided at the balancer 10. This control section 34 is structured by the input device 26, the monitor 30, the central calculation processing device 32 (CPU) and a storage device 36 (RAM).

By the way, the input device 26, the monitor 30, the central calculation processing device 32 (CPU) and the storage device 36 (RAM) are respectively connected to a bus 38.

At this storage device 36 are stored: a relationship between tire size and a ground contact length, in a tire peripheral direction, with which the rim-assembled tire 18 contacts a road surface; a relationship between the tire peripheral direction ground contact length and a rim peripheral direction length of the rim that corresponds to this ground contact length; a relationship between a correction weight amount of the correction weight 42 attached to a rim periphery and a tire peripheral direction length of the correction weight 42; a correction weight amount which is a limit for exerting detrimental effects on directional stability and handling stability (for example, 10 g); and a plurality of types of correction weight, whose correction weight amounts are the same and whose lengths in the tire peripheral direction and lengths in a tire transverse direction respectively differ.

Here, the "relationship between tire size and a ground contact length in a tire peripheral direction with which the rim-assembled tire contacts a road surface" refers to, for example, a table in which, tire peripheral direction ground contact lengths with which a tire contacts a road surface are obtained from inputted tire sizes, each found from a relationship between average loading weight which is loaded at the tire when tire of the tire size is mounted to vehicle, and strength of the tire in a case in which tire of the tire size is filled with a predetermined standard air pressure.

Further, the "relationship between a correction weight amount of a correction weight attached to a rim periphery and a tire peripheral direction length of the correction weight" refers to, for example, a table in which, weight per unit length of correction weight is found in advance, and tire peripheral direction lengths of the correction weights, which are found from the weight per unit length and the correction weight amounts.

Next, a wheel balance adjustment method using the balancer 10 described above will be described on the basis of the flowchart shown in FIG. 7.

First, as shown in FIG. 1, the rim-assembled tire 18 is attached to the rotation shaft 16 of the balancer 10. At this time, the fixing utensil 20 is fixed to the rotation shaft 16 from the outer side of the rim-assembled tire 18 such that the rim-assembled tire 18 will not detach from the rotation shaft 16. Also, in consideration of safety, the tire cover 24 is caused to cover the upper half of the rim-assembled tire 18.

Figure 7:
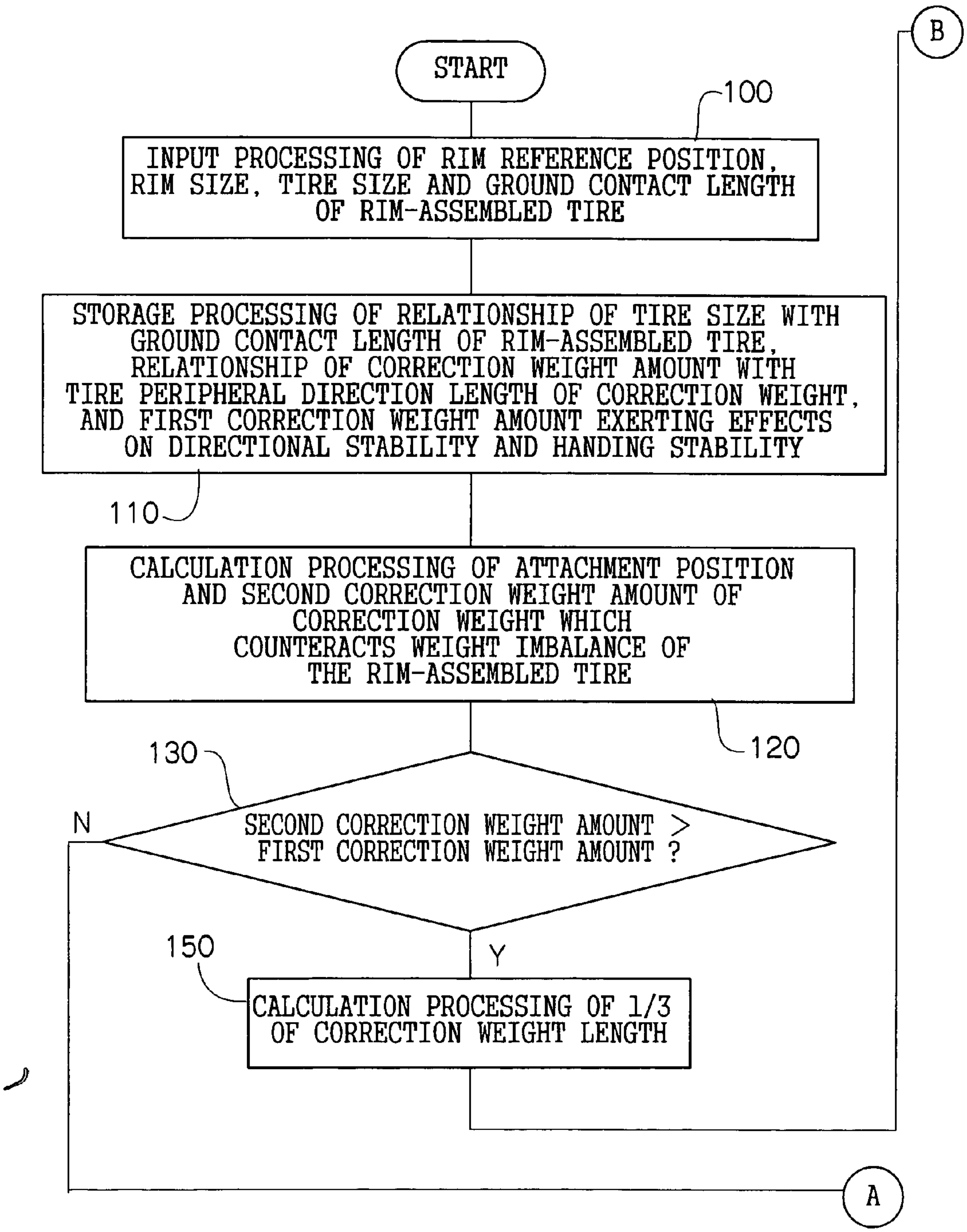
FIG. 7 is a flowchart showing a wheel balance adjustment method of the present invention.

Next, as shown in FIG. 7, in an input step of step 100, the reference position of a rim 40 of the rim-assembled tire 18 on the balancer main body 12, the rim size, the tire peripheral direction ground contact length of the rim-assembled tire 18 and the tire size are inputted at the input device 26.

Next, in a storing step of step 110, the relationship between the tire size and the tire peripheral direction ground contact length with which the rim-assembled tire 18 contacts a road surface, the relationship between the ground contact length of the rim-assembled tire 18 and the rim peripheral direction length of the rim 40 that corresponds to this ground contact length, the relationship between a correction weight amount of a correction weight attached to the rim periphery and the tire peripheral direction length of the correction weight, and a first correction weight amount, which is the limit for exerting detrimental effects on directional stability and handling stability (for example, 10 g), are respectively stored at the storage device 36.

Next, in a calculation step of step 120, the rotation shaft 16 of the balancer 10 is rotated. An attachment position of the correction weight 42 and a second correction weight amount of this correction weight 42, which counteract a weight imbalance of the rim-assembled tire 18, are calculated.

By the way, in this calculation step, a method for calculating the attachment position and correction weight amount of the correction weight 42 is similar to a calculation method of conventional balancers.

Next, in a judgement step of step 130, sizes of the second correction weight amount and the first correction weight amount (10 g) are judged by comparison.

In a case in which the second correction weight amount is smaller than the first correction weight amount (10 g), in an output processing step of step 140, the attachment position and second correction weight amount of the correction weight 42 that were calculated in the calculation step of step 120 are outputted, and displayed at the monitor 30.

On the other hand, in a case in which the second correction weight amount is larger than the first correction weight amount (10 g), in a calculation step of a next step 150, one third of the rim peripheral direction length (W) of the correction weight 42 that was specified in the calculation step of step 120 (W/3) is calculated.

Next, in a judgement step of step 160, sizes of a rim peripheral direction length S of the rim 40 corresponding to the ground contact length of the rim-assembled tire 18 (see FIG. 3), which was stored in the storing step of step 110, and the one third of the rim peripheral direction length (W) of the correction weight, which was calculated in the calculation step of step 150 (W/3), are judged by comparison.

In a case in which it is judged in the judgement step of step 160 that the rim peripheral direction length S of the rim 40 corresponding to the ground contact length of the rim-assembled tire 18 is longer than the one third of the rim peripheral direction length (W) of the correction weight 42 (W/3), in a calculation step of a next step 170, the second correction weight amount is divided into three equal parts. Accordingly, the single correction weight 42 is divided into three correction weights 42L, 42C and 42R.

Next, in a calculation step of step 180, attachment positions of the respective correction weights 42L, 42C and 42R that will make the imbalance that the rim-assembled tire 18 causes smaller by the respective correction weights 42L, 42C and 42R, which have been divided into three equal parts, being dispersed in the rim peripheral direction and attached to the periphery of the rim 40, are respectively calculated.

Figure 3:
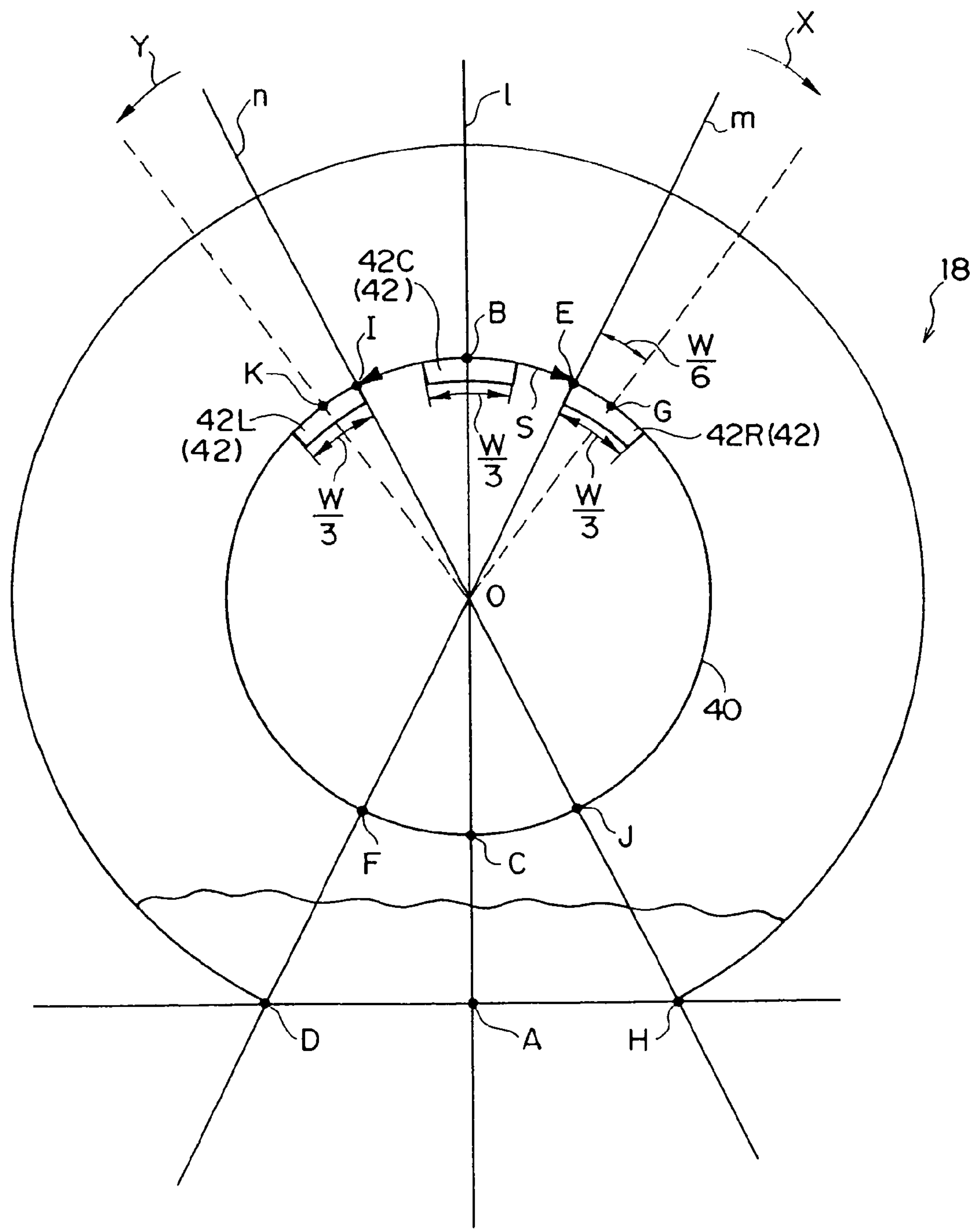
FIG. 3 is a phase diagram in which a correction weight is dispersed and attached to a rim periphery.

Specifically, as shown in FIG. 3, as attachment positions of the respective correction weights 42L, 42C and 42R, points B, G and K are respectively calculated:

of points B and C (there are two points) at which a straight line 1 joining a center point A of the ground contact region of the rim-assembled tire 18 with the road surface with a center point 0 of the rim-assembled tire 18 crosses the rim periphery, point B forms a 180° angle with the center point A;

with, of points E and F (there are two points) at which a straight line m joining a point D, which is one ground contact end of the rim-assembled tire 18, with the center point 0 of the rim-assembled tire 18 crosses the rim periphery, point E, which forms a 180° angle with the point D, as a reference, point G is displaced to an outer side (the side in the direction of arrow X in FIG. 3) along the rim peripheral direction to the extent of a distance (W/6) corresponding to one sixth of the rim peripheral direction length W of the correction weight 42 before the correction weight 42 was dispersed; and with, of points I and J (there are two points) at which a straight line n joining a point H, which is another ground contact end of the rim-assembled tire 18, with the center point 0 of the rim-assembled tire 18 crosses the rim periphery, point I, which forms a 180° angle with the point H, as a reference, point K is displaced to an outer side (the side in the direction of arrow Y in FIG. 3) along the rim peripheral direction to the extent of the distance (W/6) corresponding to one sixth of the rim peripheral direction length W of the correction weight 42 before the correction weight 42 was dispersed.

By the way, the rim peripheral direction length S of the rim 40 corresponding to the ground contact length of the rim-assembled tire 18, which is mentioned above, refers to a length measured along the outer periphery of the rim 40 between point I and point E (at a side opposite to a ground contact region side of the rim-assembled tire 18).

Meanwhile, in a case in which, in the judgement step of step 160, the rim peripheral direction length S corresponding to the ground contact length of the rim-assembled tire 18 is smaller than the one third of the rim peripheral direction length W of the correction weight 42 (W/3), in a calculation step of a next step 190, an attachment position of the correction weight 42 that makes the imbalance that the rim-assembled tire 18 causes smaller by the correction weight 42 being attached to the rim periphery as is, without being dispersed in the rim peripheral direction, is calculated.

Figure 5:
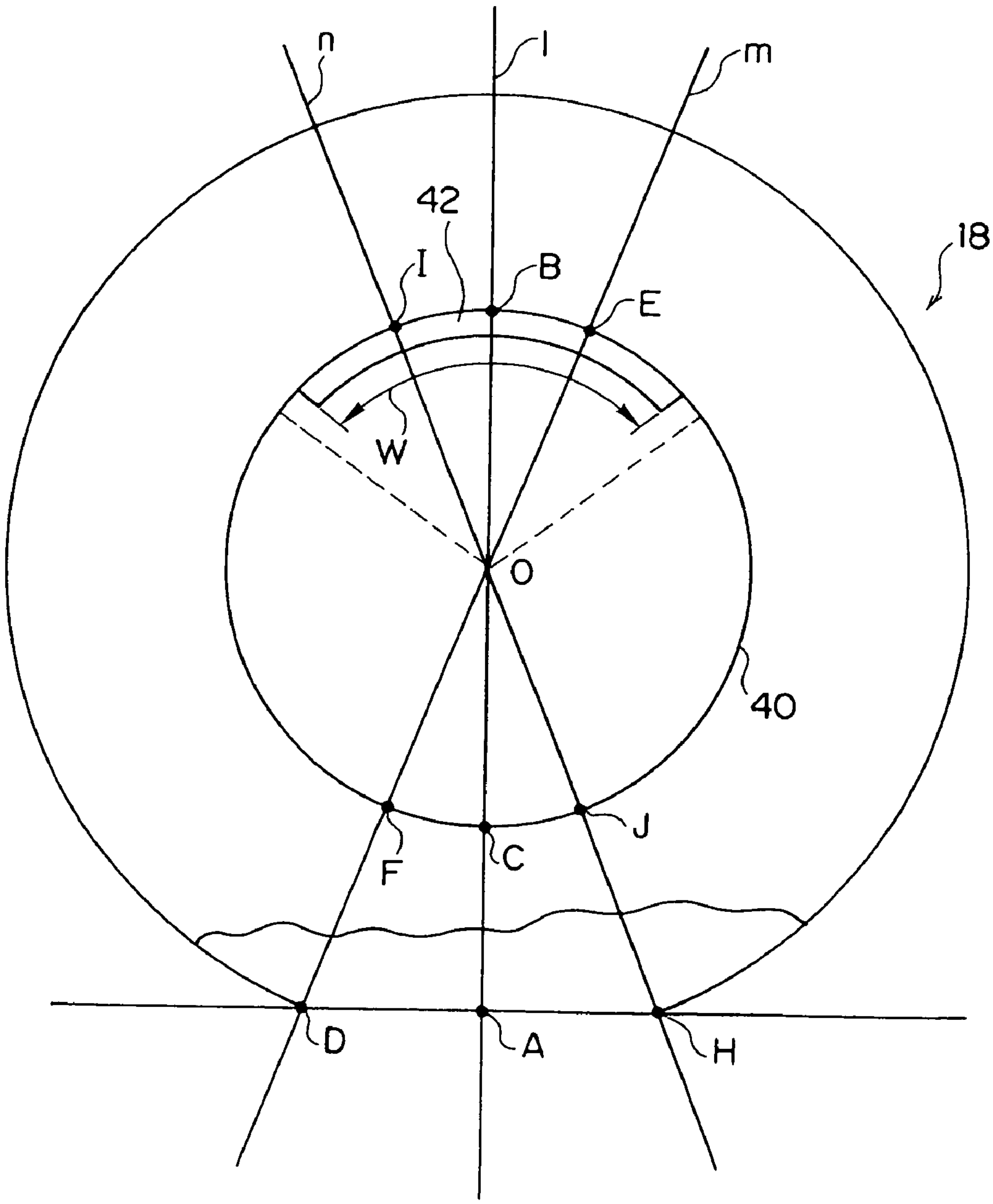
FIG. 5 is a phase diagram in which a correction weight is attached to a rim periphery without being dispersed.

Specifically, as shown in FIG. 5, of the points B and C (there are two points) at which the straight line 1 joining the center point A of the ground contact region of the rim-assembled tire 18 with the road surface with the center point O of the rim-assembled tire 18 crosses the rim periphery, point B, which forms a 180° angle with the center point A, is calculated as the attachment position of the correction weight 42.

Next, in the output processing step of step 140, the attachment positions (point B, point G and point K) of the correction weights 42, 42L, 42C and 42R, which have been calculated in the calculation step of step 180 or step 190, and the calculation weight amounts of the respective calculation weights 42, 42L, 42C and 42R are outputted and displayed at the monitor 30.

Next, in accordance with the display of the monitor 30, the correction weights 42, 42L, 42C and 42R of the displayed correction weight amounts proceed to be attached to the rim periphery. At this time, the correction weights 42, 42L, 42C and 42R proceed to be attached such that center of gravity positions of the correction weights 42, 42L, 42C and 42R coincide with the respective attachment positions described above.

Next, operations and effects of cases in which the correction weight 42 has been attached to the rim periphery by the wheel balance adjustment method described above will be described.

Figure 4:
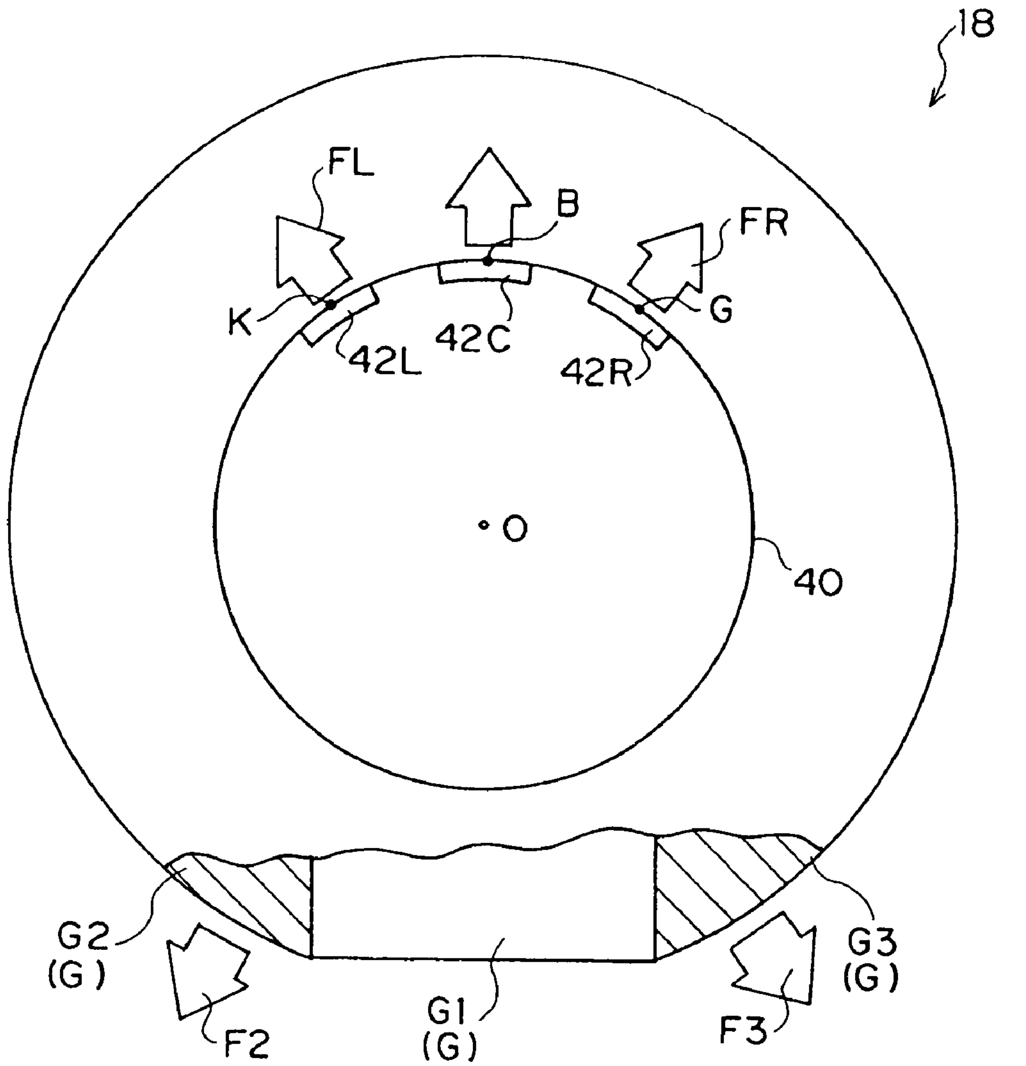
FIG. 4 is a conceptual diagram showing a force relationship between the correction weight which has been dispersed and attached to the rim periphery and a weight imbalance.

In the case in which the rim peripheral direction length S corresponding to the ground contact length of the rim-assembled tire 18 is larger than the one third of the rim peripheral direction length (W) of the correction weight 42 (W/3), as shown in FIG. 4, the correction weight 42 is dispersed along the rim periphery, the correction weight 42C is attached at a position (point B) opposing a weight imbalance portion G1 which is in the ground contact region of the rim-assembled tire 18, and the correction weights 42R and 42L are attached at positions (points G and K) opposing weight imbalance portions G2 and G3 which are outside the ground contact region.

Consequently, a state arises in which a centrifugal force F2 of the weight imbalance portion G2 which is outside the ground contact region is substantially in equilibrium with a centrifugal force FR of the correction weight 42R, and a centrifugal force F3 of the weight imbalance portion G3 which is outside the ground contact region is substantially in equilibrium with a centrifugal force FL of the correction weight 42L.

As a result thereof, a great deterioration of the equilibrium of the centrifugal force of the correction weight 42 with the centrifugal force of the weight imbalance in a case in which a portion of the weight imbalance portion G of the rim-assembled tire 18 rotating at high speed is in ground contact can be prevented, and generation of an imbalance of forces between the correction weight 42 and the weight imbalance G can be suppressed. Consequently, vibrations (displacement forces) which exert detrimental effects on the directional stability and handling stability can be greatly reduced.

Figure 6:
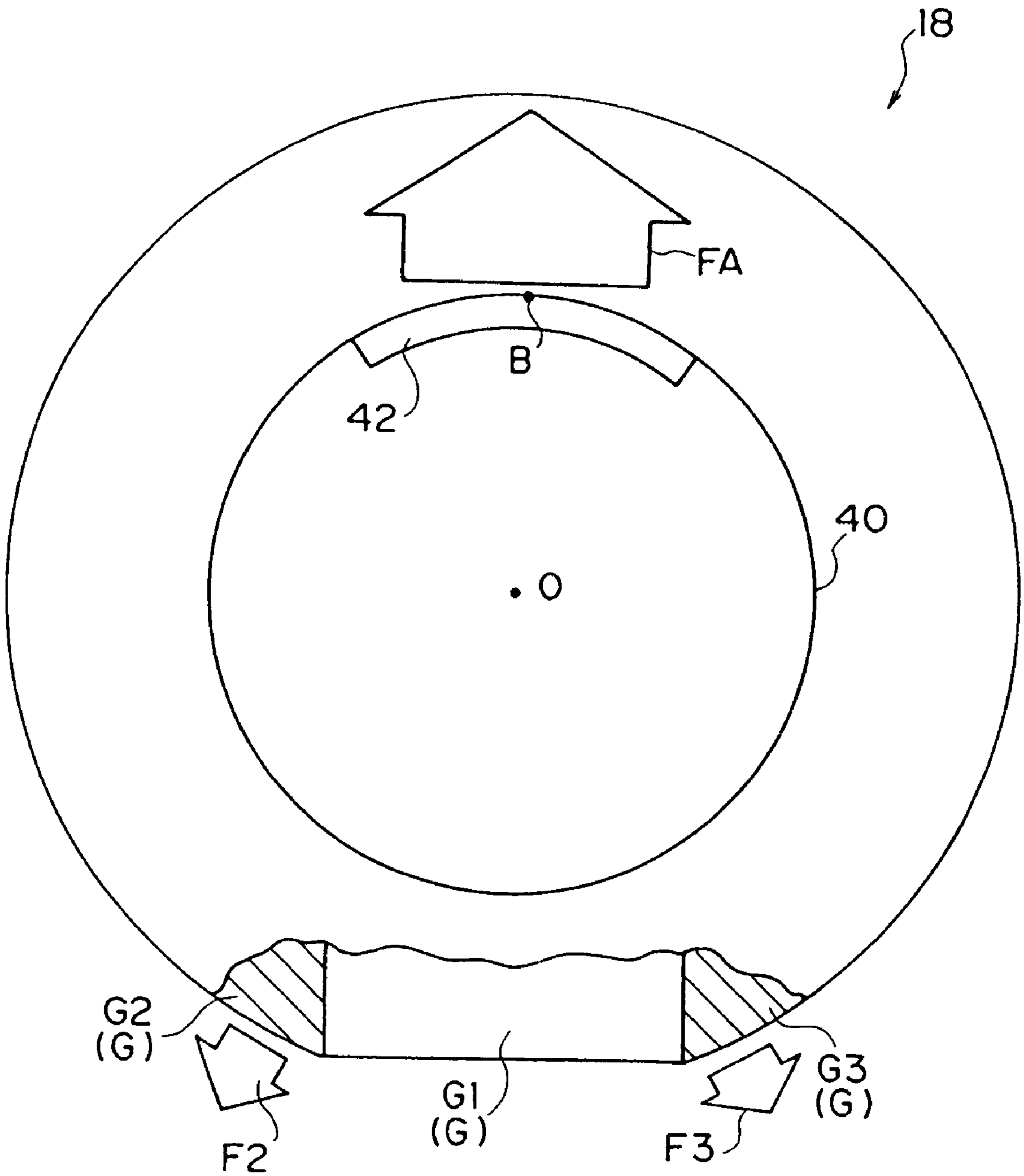
FIG. 6 is a conceptual diagram showing a force relationship between the correction weight which has been attached to the rim periphery without being dispersed and a weight imbalance.

On the other hand, in the case in which the rim peripheral direction length S corresponding to the ground contact length of the rim-assembled tire 18 is smaller than the one third of the rim peripheral direction length (W) of the correction weight 42 (W/3), there is no requirement to disperse the correction weight 42 and, by attaching the correction weight 42 to the attachment position (point B) as is, as shown in FIG. 6, a state arises in which the centrifugal forces F2 and F3 of the weight imbalance portions G2 and G3 which are outside the ground contact region are substantially in equilibrium with a centrifugal force FA of the correction weight 42.

As a result thereof, a great deterioration of the equilibrium of the centrifugal force of the correction weight 42 with the centrifugal force of the weight imbalance in a case in which a portion of the weight imbalance portion 6 of the rim-assembled tire 18 rotating at high speed is in ground contact can be prevented, generation of an imbalance of forces between the correction weight 42 and the weight imbalance G can be suppressed, and vibrations (displacement forces) which exert detrimental effects on the directional stability and handling stability can be greatly reduced.

Next, a wheel balance adjustment method which is another mode will be described on the basis of a flowchart shown in FIGS. 8 and 9. By the way, steps that duplicate the wheel balance adjustment method described above are given the same reference numerals, and descriptions thereof are omitted as appropriate.

First, similarly, as shown in FIG. 1, the rim-assembled tire 18 is attached to the rotation shaft 16 of the balancer 10.

Figure 8:
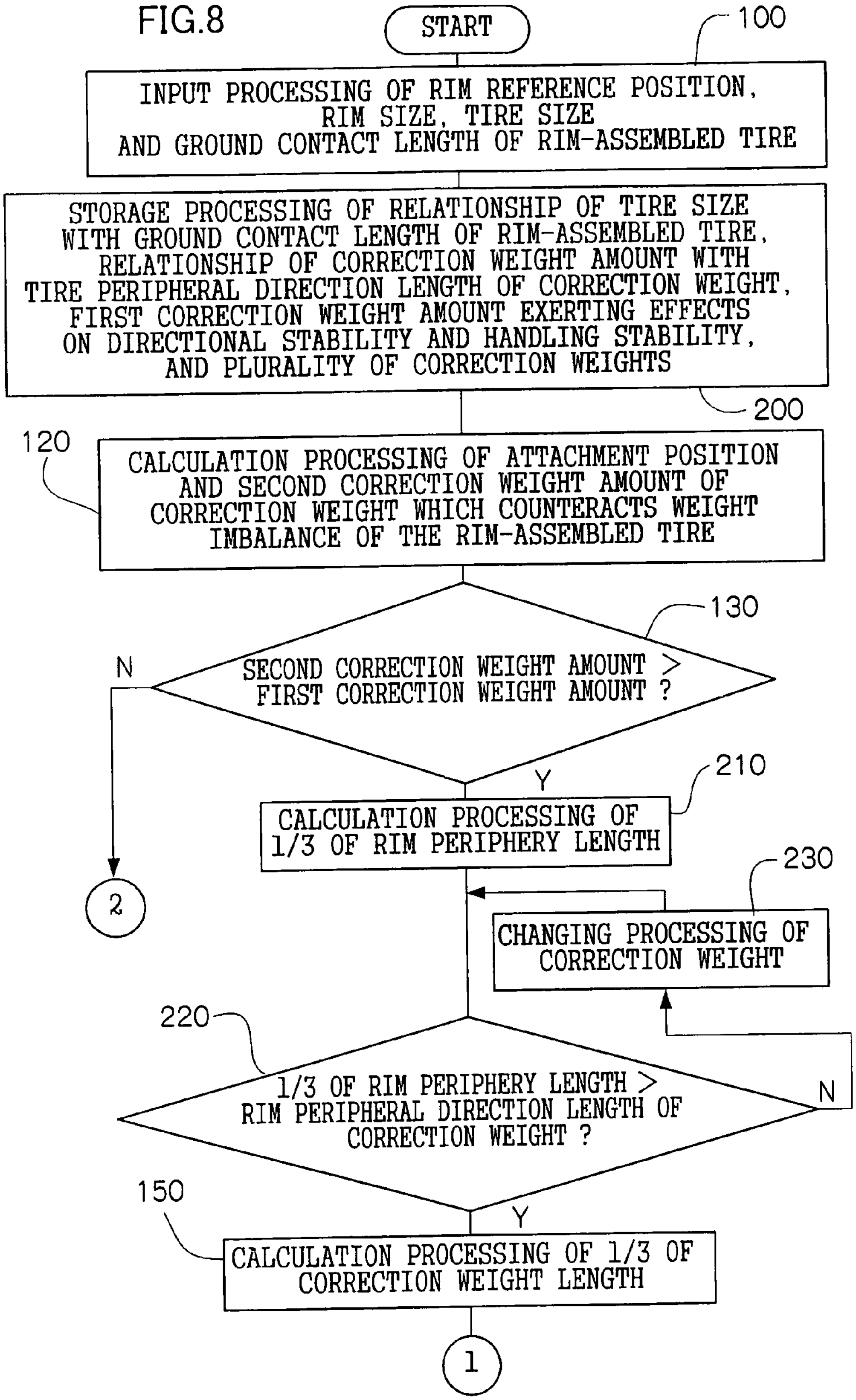
FIG. 8 is a portion of a flowchart showing a wheel balance adjustment method of another mode of the present invention.
Figure 9:
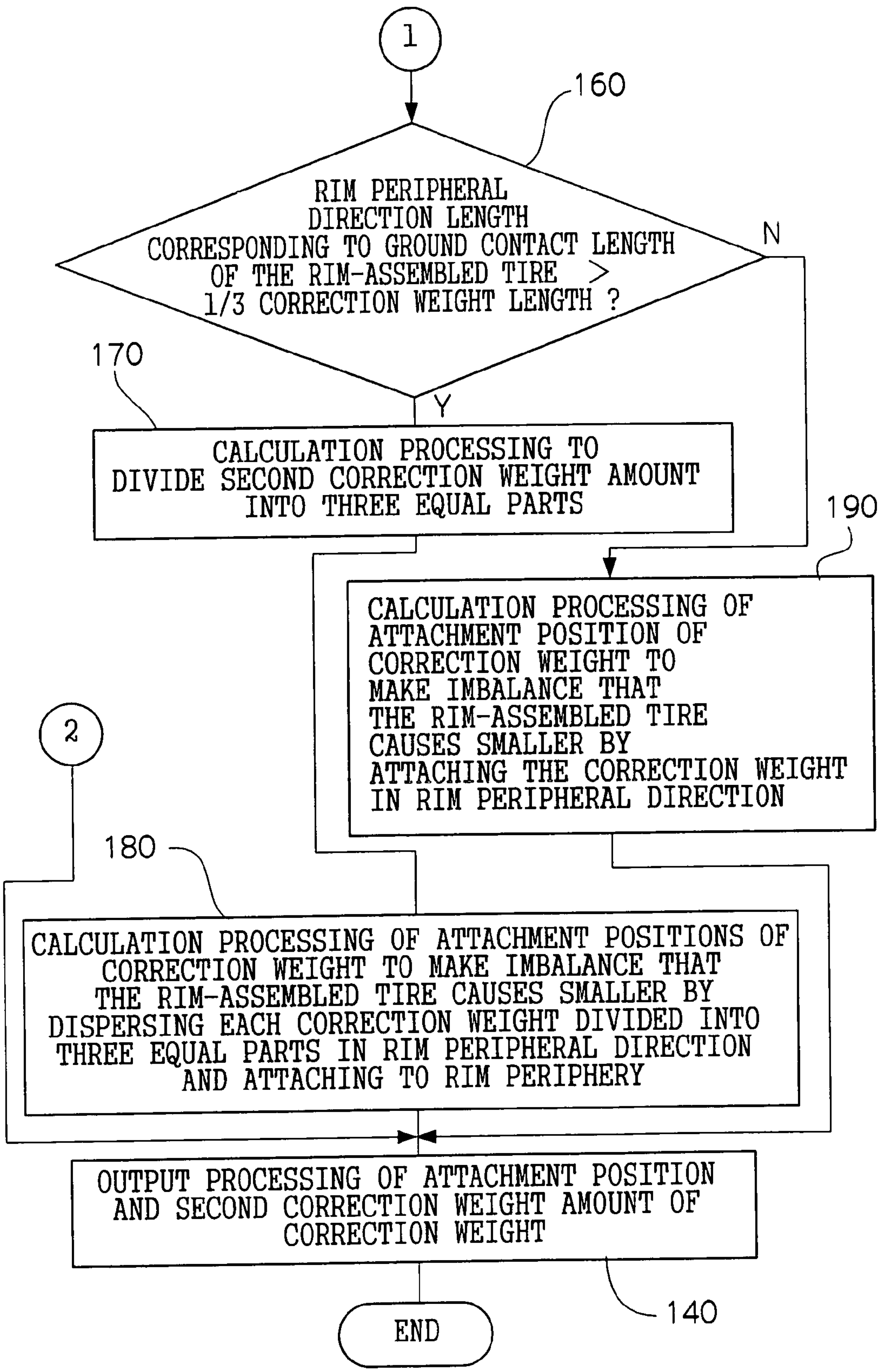
FIG. 9 is a portion of a flowchart showing the wheel balance adjustment method of the other mode of the present invention.
Figure 10:
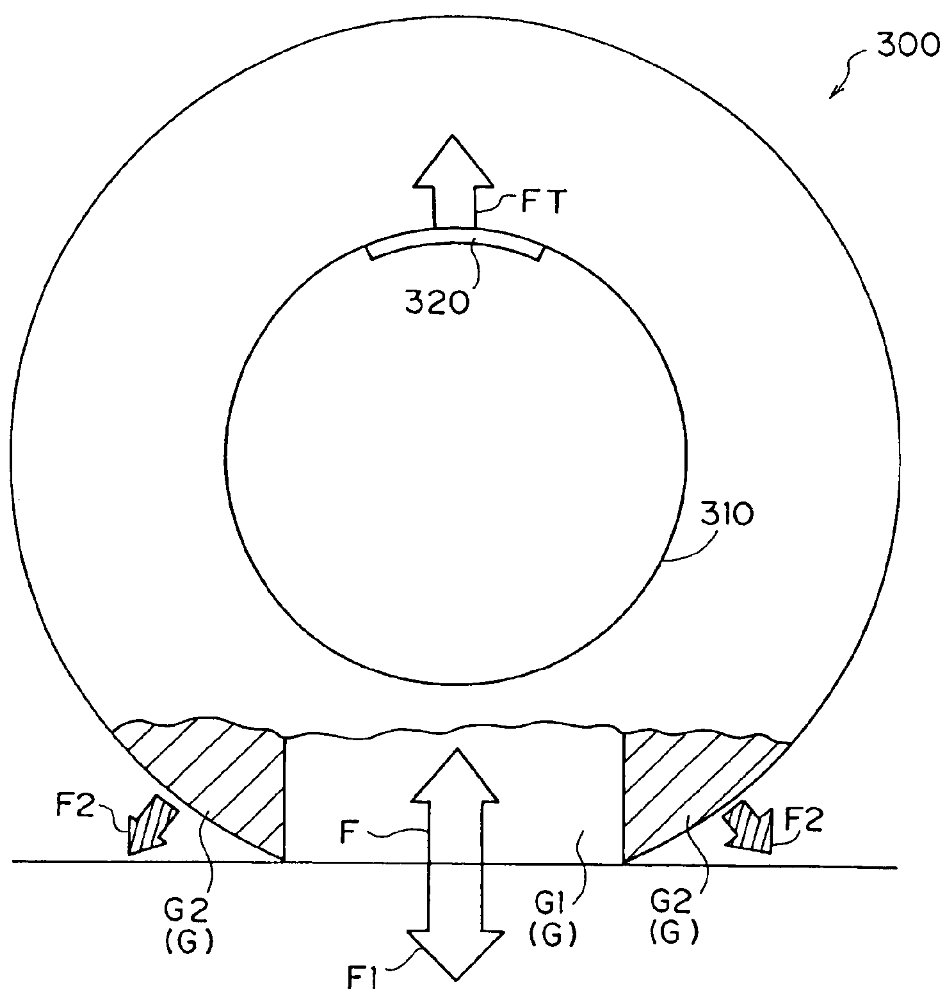
FIG. 10 is a conceptual diagram showing a force relationship between a correction weight which has been attached according to a conventional wheel balance adjustment method and a weight imbalance.

Next, as shown in FIGS. 8 and 9, in the input step of step 100, the reference position of the rim of the rim-assembled tire 18 on the balancer main body 12, the rim size, the tire peripheral direction ground contact length of the rim-assembled tire 18 and the tire size are inputted at the input device 36.

Next, in a storing step of step 200, the relationship between the tire size and the tire peripheral direction ground contact length with which the rim-assembled tire 18 contacts a road surface, the relationship between the ground contact length of the rim-assembled tire 18 and the rim peripheral direction length of the rim 40 that corresponds to this ground contact length, the relationship between a correction weight amount of a correction weight attached to the rim periphery and the tire peripheral direction length of the correction weight, the first correction weight amount which is the limit for exerting detrimental effects on directional stability and handling stability (for example, 10 g) and, additionally thereto, types of correction weight of a plurality of sizes, whose correction weight amounts are the same and whose rim peripheral direction lengths and rim transverse direction lengths differ, are respectively stored at the storage device 36.

Next, in the calculation step of step 120, the rotation shaft 16 of the balancer 10 is rotated. The attachment position of the correction weight 42 and the second correction weight amount of this correction weight 42, which counteract the weight imbalance of the rim-assembled tire 18, are calculated.

By the way, in this calculation step, the method for calculating the attachment position and correction weight amount of the correction weight 42 is similar to the calculation method of conventional balancers.

Next, in the judgement step of step 130, the sizes of the second correction weight amount and the first correction weight amount (10 g) are judged by comparison.

In the case in which the second correction weight amount is smaller than the first correction weight amount (10 g), in the output processing step of step 140, the attachment position and second correction weight amount of the correction weight that have been calculated in the calculation step of step 120 are outputted, and displayed at the monitor 30.

On the other hand, in the case in which the second correction weight amount is larger than the first correction weight amount (10 g), in a calculation step of a next step 210, a rim periphery length is calculated from the rim size, and a length corresponding to one third of the rim periphery length is calculated.

Next, in a judgement step of step 220, the length corresponding to one third of the rim periphery length and the rim peripheral direction length of the correction weight are judged by comparison.

In a case in which, as a result thereof, it is judged that the rim peripheral direction length of the correction weight is longer than the length corresponding to one third of the rim periphery length, in a changing step of step 230, a different correction weight, the rim peripheral direction length of which is shorter than the length corresponding to one third of the rim periphery length, is extracted from the storage means 36, and the correction weight is changed.

By the way, although the rim peripheral direction length of this different correction weight becomes shorter than the length corresponding to one third of the rim periphery length, the rim transverse direction length becomes longer in proportion thereto. For example, if the rim peripheral direction length of the correction weight is multiplied by half, the rim transverse direction length is multiplied by two. Further, the correction weight amount of the correction weight before being changed is the same as the correction weight amount of the correction weight after being changed.

In a case in which, in the judgement step of step 220, it is judged that the rim peripheral direction length of the correction weight specified in the calculation step of step 120 is shorter than the length corresponding to one third of the rim periphery length, or in a case in which it is judged that the rim peripheral direction length of the different correction weight changed in the changing step 230 is shorter than the length corresponding to one third of the rim periphery length, in the calculation step of the next step 150, a length corresponding to one third of the rim peripheral direction length of the correction weight specified in the calculation step of step 120 or the different correction weight changed to in the changing step 230 is calculated.

Subsequently, similarly to the wheel balance adjustment method that has already been described, considering the different correction weight changed to in the changing step 230, the attachment position on the rim periphery and correction weight amount of the different correction weight are calculated, and displayed at the monitor 30.

By the way, the type of the different correction weight that has been changed to is also displayed at the monitor 30. Thereafter, in accordance with this display of the monitor 30, the correction weight is attached to the rim periphery.

According to the present invention, correction weights can be attached whose rim peripheral direction lengths are always shorter than the length corresponding to one third of the rim periphery length (a length of a circular arc of the rim that corresponds to a central angle of 120°), and the vibrations which exert detrimental effects on the directional stability and handling stability can be greatly reduced.

TEST EXAMPLES

Next, a tire which had been adjusted by a conventional wheel balance adjustment method and a tire which had been adjusted by the wheel balance adjustment method of the present invention were respectively mounted, and a feeling test relating handling stability was carried out by a driver.

As test conditions, a vehicle A, at which a tire with tire size 195/65R14 was attached to a wheel which had been adjusted by the conventional balance adjustment method and this tire was mounted to an 1800 cc FF vehicle, and a vehicle A, at which a tire with tire size 195/65R14 was attached to a wheel which had been adjusted by the balance adjustment method of the present invention and this tire was mounted to an 1800 cc FF vehicle, were respectively compared.

Further, a vehicle B, at which a tire with tire size 205/60R15 was attached to a wheel which had been adjusted by the conventional balance adjustment method and this tire was mounted to a 2000 cc FR vehicle, and a vehicle B, at which a tire with tire size 205/60R15 was attached to a wheel which had been adjusted by the balance adjustment method of the present invention and this tire was mounted to a 2000 cc FR vehicle, were respectively compared.

Further, the test was executed for three speed ranges: vehicle speeds of up to 80 km/h, from 80 km/h to 120 km/h, and 120 km/h and above.

Results of these tests were as shown in table 1 below.

The tests were evaluated with 10 points being full points, meaning that the larger a value in table 1, the more favorable the test result.

Specific evaluations are as shown below.

Evaluation points of seven or more points means a result at or above an ordinary level.

With regard to evaluation point differences, +/− is a degree which is sensed if attention is paid, 0.5 is a degree which is comparatively easily sensed in a case of a vehicle driving usually, and 1 or more is a degree which anyone would sense. That is, the greater the evaluation points difference, the more easily it can be felt.

TABLE 1

| | Vehicle A | Vehicle B |
|---|---|---|
| Conventional balance adjustment method | | |
| 80 km/h or less | 7 (imbalance vibrations not sensed) | 7 (imbalance vibrations not sensed) |
| 80 to 120 km/h | 7− (vibrations sensed to a certain extent; steering wheel loose) | 6.5+ (vibrations sensed to a certain extent; steering wheel loose and renponses slow) |
| 120 km/h or more | 6 (vibrations sensed in floor, steering wheel; with steering wheel in a loose state, state of road surface difficult to discern) | 6− (vibrations arising; insecurity in stability sensed) |
| Balance adjustment method of the present invention | | |
| 80 km/h or less | 7+ (smooth ground contact sensation) | 7+ (smooth ground contact sensation) |
| 80 to 120 km/h | 7+ (no change from 80 km/h or less) | 7.5− (ground contact sensation arising and sensation of stability sensed) |
| 120 km/h or more | 7+ (increasing sensation of stability) | 7.5 (rising sensation of stability of steering wheel) |

As is shown in table 1 above, at a vehicle at which a tire which was attached to a wheel that had been adjusted by the balance adjustment method of the present invention was mounted, particularly in the high-speed region (120 km/h or more), stability was raised.

EFFECTS OF THE INVENTION

According to the wheel balance adjustment device and wheel balance adjustment method of the present invention, an imbalance that occurs when a portion of a weight imbalance portion of a tire is in ground contact can be made smaller, and amplitudes of vibrations which exert detrimental effects on directional stability and handling stability can be greatly reduced.

What is claimed is:

1. A wheel balance adjustment device characterized by comprising:

first calculating means which calculates an attachment position and correction weight amount of a correction weight which counteract a weight imbalance of a tire assembled to a rim;

first comparing means which compares a rim peripheral direction length corresponding to a tire peripheral direction ground contact length of a ground contact region, at which the rim-assembled tire contacts a road surface, with a rim peripheral direction length of the correction weight; and second calculating means which, in a case in which the rim peripheral direction length of the correction weight is shorter than the rim peripheral direction length corresponding to the ground contact length, and in a case in which the rim peripheral direction length of the correction weight is longer than the rim peripheral direction length corresponding to the ground contact length that is a case in which a portion by which the correction weight is longer than the rim peripheral direction length corresponding to the ground contact length is not more than a predetermined value, calculates attachment positions of the correction weight, which has been divided, in order to make an imbalance that occurs when a portion of the weight imbalance portion of the rim-assembled tire is in ground contact smaller by dividing the correction weight into a plurality of units and attaching the units to the rim periphery with dispersing in the rim peripheral direction.

2. The wheel balance adjustment device recited in claim 1, characterized by further comprising:

storing means which stores a plurality of correction weights whose correction weight amounts are the same and whose rim peripheral direction lengths and rim transverse direction lengths differ;

second comparing means which compares the rim peripheral direction length of the correction weight with a rim periphery length of the rim of the rim-assembled tire; and changing means which, in a case in which the rim peripheral direction length of the correction weight is more than or equal to a predetermined value of the rim periphery length, selects a different correction weight, whose rim peripheral direction length is less than the predetermined value of the rim periphery length, from the plurality of correction weights stored in the storing means and changes the correction weight, and characterized by, at the first comparing means, comparing the rim peripheral direction length corresponding to the ground contact length with the rim peripheral direction length of the different correction weight, and at the second calculating means, in a case in which the rim peripheral direction length of the different correction weight is shorter than the rim peripheral direction length corresponding to the ground contact length, and in a case in which the rim peripheral direction length of the different correction weight is longer than the rim peripheral direction length corresponding to the ground contact length that is a case in which a portion by which the different correction weight is longer than the rim peripheral direction length corresponding to the ground contact length is not more than a predetermined value, calculating attachment positions of the different correction weight, which has been divided, in order to make an imbalance that occurs when a portion of the weight imbalance portion of the rim-assembled tire is in ground contact smaller by dividing the different correction weight into a plurality of units and attaching the units to the rim periphery with dispersing in the rim peripheral direction.

3. The wheel balance adjustment device recited in claim 1, characterized by the attachment positions of the correction weight which has been divided at the second calculating means being a position which opposes a weight imbalance portion which is present at the ground contact region at which the tire is in ground contact with the road surface and positions which oppose weight imbalance portions which are present outside the ground contact region of the tire.

4. The wheel balance adjustment device recited in claim 1, characterized by, at the second calculating means, in a case in which the rim peripheral direction length of the correction weight is longer than the rim peripheral direction length corresponding to the ground contact length that is a case in which the portion by which the correction weight is longer than the rim peripheral direction length corresponding to the ground contact length is greater than the predetermined value, calculating an attachment position of the correction weight in order to make the imbalance that occurs when a portion of the weight imbalance portion of the rim-assembled tire is in ground contact smaller by attaching the correction weight to the rim periphery without dispersing the correction weight.

5. A wheel balance adjustment method characterized by comprising:

a tire attaching step of attaching a tire assembled to a rim to a wheel balance adjustment device;

a first calculating step of calculating an attachment position and correction weight amount of a correction weight which counteract a weight imbalance of the rim-assembled tire;

a first comparing step of comparing a rim peripheral direction length corresponding to a tire peripheral direction ground contact length of a ground contact region, at which the rim-assembled tire contacts a road surface when the rim-assembled tire is attached to a vehicle, with a rim peripheral direction length of the correction weight;

a second calculating step of, in a case in which the rim peripheral direction length of the correction weight is shorter than the rim peripheral direction length corresponding to the ground contact length, and in a case in which the rim peripheral direction length of the correction weight is longer than the rim peripheral direction length corresponding to the ground contact length that is a case in which a portion by which the correction weight is longer than the rim peripheral direction length corresponding to the ground contact length is not more than a predetermined value, calculating attachment positions of the correction weight, which has been divided, in order to make an imbalance that occurs when a portion of the weight imbalance portion of the rim-assembled tire is in ground contact smaller by dividing the correction weight into a plurality of units and attaching the units to the rim periphery with dispersing in the rim peripheral direction; and a weight attaching step of attaching each of the correction weight that has been divided at the attachment positions of the correction weight by the second calculating step.

6. The wheel balance adjustment method recited in claim 5, characterized by further comprising:

a storing step of storing a plurality of correction weights whose correction weight amounts are the same and whose rim peripheral direction lengths and rim transverse direction lengths differ;

a second comparing step of comparing the rim peripheral direction length of the correction weight with a rim periphery length of the rim of the rim-assembled tire; and a changing step of, in a case in which the rim peripheral direction length of the correction weight is at least a predetermined value of the rim periphery length, selecting a different correction weight, whose rim peripheral direction length is less than the predetermined value of the rim periphery length, from the plurality of stored correction weights and changing the correction weight, and characterized by, in the first comparing step, comparing the rim peripheral direction length corresponding to the ground contact length with the rim peripheral direction length of the different correction weight, in the second calculating step, in a case in which the rim peripheral direction length of the different correction weight is shorter than the rim peripheral direction length corresponding to the ground contact length, and in a case in which the rim peripheral direction length of the different correction weight is longer than the rim peripheral direction length corresponding to the ground contact length that is a case in which a portion by which the different correction weight is longer than the rim peripheral direction length corresponding to the ground contact length is not more than a predetermined value, calculating attachment positions of the different correction weight, which has been divided, in order to make an imbalance that occurs when a portion of the weight imbalance portion of the rim-assembled tire is in ground contact smaller by dividing the different correction weight into a plurality of units and attaching the units to the rim periphery with dispersing in the rim peripheral direction, and in the weight attaching step, attaching each of the different correction weight that has been divided at the attachment positions of the different correction weight by the second calculating step.

7. The wheel balance adjustment method recited in claim 5, characterized by the correction weight which has been divided being attached at a position which opposes a weight imbalance portion which is present at the ground contact region at which the tire is in ground contact with the road surface and positions which oppose weight imbalance portions which are present outside the ground contact region of the tire.

8. The wheel balance adjustment method recited in any one of claim 5, characterized by, in the second calculating step, in a case in which the rim peripheral direction length of the correction weight is longer than the rim peripheral direction length corresponding to the ground contact length that is a case in which the portion by which the correction weight is longer than the rim peripheral direction length corresponding to the ground contact length is greater than the predetermined value, calculating an attachment position of the correction weight in order to make the imbalance that occurs when a portion of the weight imbalance portion of the rim-assembled tire is in ground contact smaller by attaching the correction weight to the rim periphery without dispersing the correction weight, and in the weight attaching step, attaching the correction weight at the attachment position of the correction weight of the second calculating step.

* * * * *